United States Patent [19]

Powers

[11] 4,052,731
[45] Oct. 4, 1977

[54] CASSETTE-LIKE DEVICE FOR ADVANCING AND WITHDRAWING A PREDETERMINED LENGTH OF FILM TO AND FROM A CAMERA

[75] Inventor: Robert H. Powers, Rochester, N.Y.

[73] Assignee: Itek Corporation, Lexington, Mass.

[21] Appl. No.: 675,390

[22] Filed: Apr. 9, 1976

[51] Int. Cl.$^2$ .............................................. G03B 17/26
[52] U.S. Cl. ................................... 354/275; 242/197; 352/158
[58] Field of Search ......................... 352/79, 159, 158; 354/174, 275, 276, 277, 281, 282, 211; 353/26 R, 26 A; 242/187, 197, 195, 192, 208, 210, 207, 71 R, 71.1, 71.5, 71.6, 71.7, 71.4; 226/91, 92

[56] References Cited

U.S. PATENT DOCUMENTS

| 1,560,615 | 11/1925 | Speidel | 242/71 R |
|---|---|---|---|
| 3,499,376 | 3/1970 | Swift | 354/211 |
| 3,600,070 | 8/1971 | Downey | 352/72 |
| 3,764,088 | 10/1973 | Yamada et al. | 352/158 X |
| 3,780,634 | 12/1973 | Van Osch | 242/71.6 X |
| 3,934,840 | 1/1976 | Inaga | 226/92 X |

FOREIGN PATENT DOCUMENTS 1,222,365   8/1966   Germany .............................. 354/275

OTHER PUBLICATIONS

Galatha, IBM Technical Disclosure, "Automatic Film Threading Camera" vol. 16, No. 12, 5/1974.

Primary Examiner—Edna M. O'Connor
Attorney, Agent, or Firm—Homer O. Blair; Robert L. Nathans; Gerald H. Glanzman

[57] ABSTRACT

A two-part replaceable cassette-like device is provided, having a disposable cassette portion and a light sealed buffer box, having a pair of drive rollers therein and which is detachably fastened to the disposable cassette, whereby the photosensitive material driven out of the cassette will be driven through the light sealed buffer box into a camera processor. Upon exhaustion of the photosensitive media within the cassette, the buffer box is removed from the cassette for reuse and the cassette is thrown away. A gear coupled to the buffer box roller material drive means is automatically rotated during insertion and withdrawal of the buffer box to and from the camera due to roller contact with a stationary drive gear positioned within such camera.

22 Claims, 7 Drawing Figures

U.S. Patent    Oct. 4, 1977    4,052,731
PRIOR ART FIG. 1.
FIG. 2.
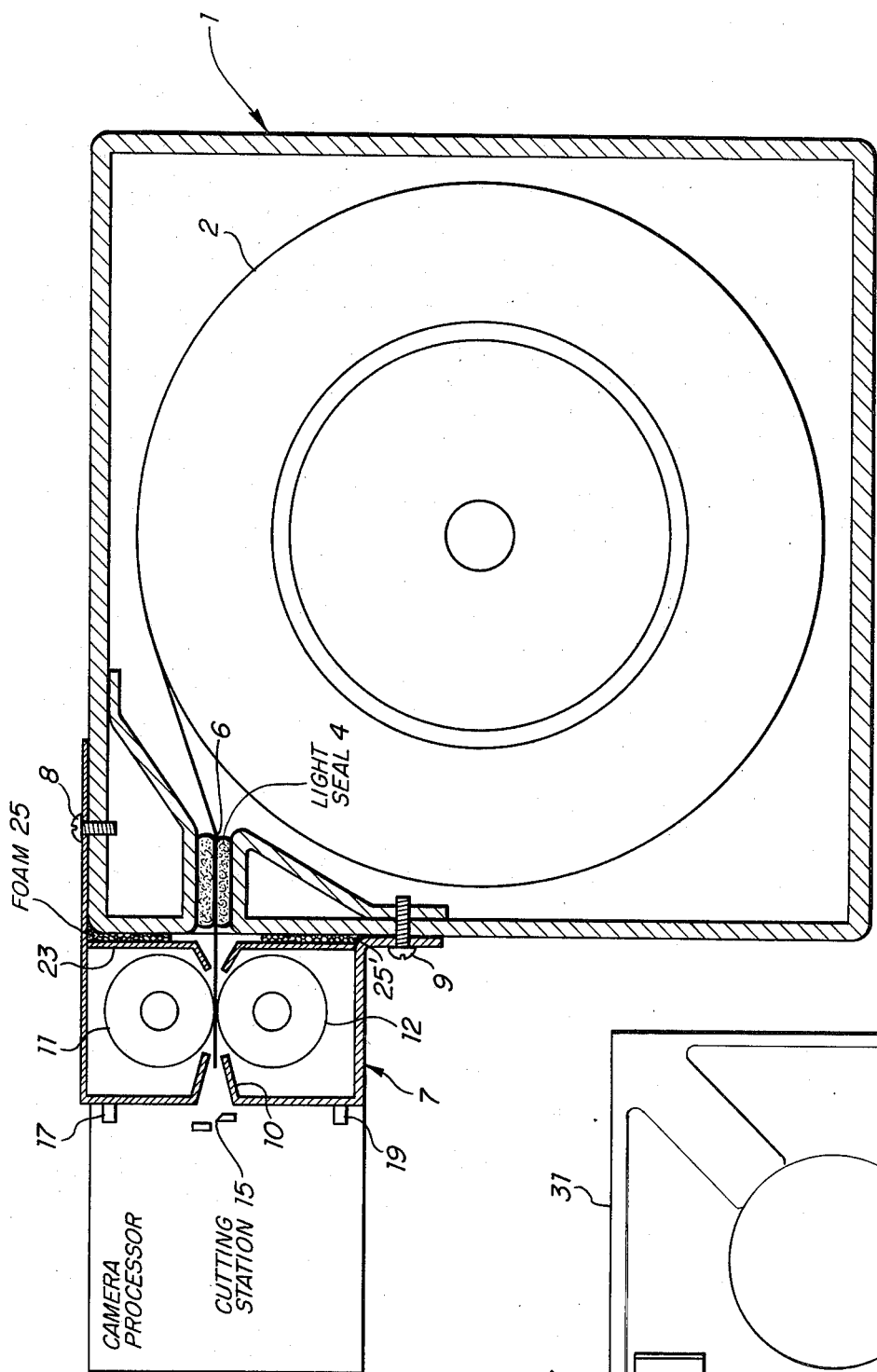
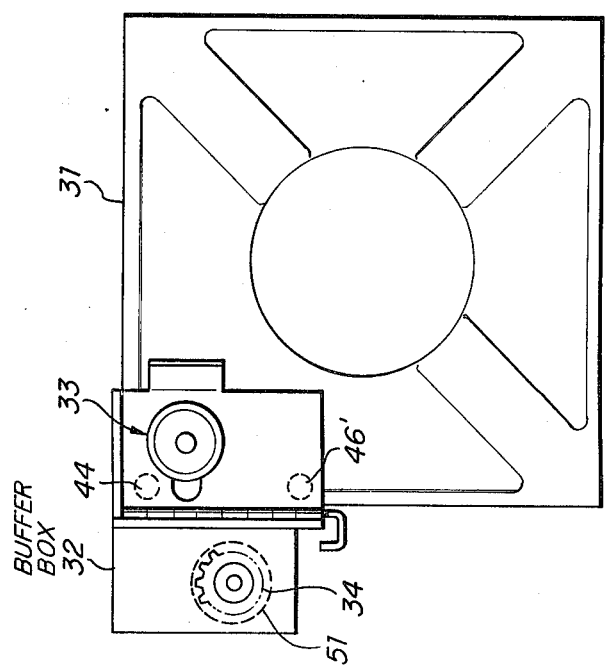

CASSETTE-LIKE DEVICE FOR ADVANCING AND WITHDRAWING A PREDETERMINED LENGTH OF FILM TO AND FROM A CAMERA

BACKGROUND OF THE INVENTION

This invention relates to the field of cassette-like devices containing photosensitive film.

In accordance with a first prior art approach, a cassette is provided containing a roll of photosensitive media. The film is driven from the cassette by a pair of rollers external to the cassette and within the camera. One problem with this type of approach is that the lead end becomes fogged when the cassette is removed from the industrial camera since the lead end must always be present external of the cassette. Should this not occur, it would be impossible to drive the photosensitive media out of the cassette by means of the external rollers upon subsequent use of the cassette.

Another approach is to provide a pair of rollers within the cassette which are capable of eliminating the above-mentioned problem of fogging as the leader may be driven totally within the cassette and thereafter driven out again. This approach, however, is costly since the rollers, being inside the cassette, are thrown out when the cassette is disposed of upon the exhaustion of the photosensitive media therein.

Furthermore, through the use of both of these approaches, it is possible that the film may be driven by error all the way into the cassette (in the second approach beyond the "bite" of the roller pair) so that the media cannot be thereafter driven out of the cassette to thereby waste the remaining material therein.

It is thus highly desirable to provide a replaceable cassette-like supply device wherein the roller portion associated therewith is preserved for use with subsequent disposable cassette in the interest of economy and the material is not fogged due to the elimination of the extended lead edge.

In accordance with a pending patent application U.S. Ser. No. 611,595, filed Sept. 8, 1975, entitled "Two-Part Photosensitive Media Replaceable Cassette Supply Device" by Daniel H. Robbins, a disposable cassette containing photosensitive material is detachably coupled to a light tight buffer box having a pair of drive rollers therein. This two-part supply device is inserted into an industrial camera. The material is pushed from the disposable cassette through the light tight buffer box into the camera for use therein. If it is desired to replace one type of photosensitive material with another, before the material in the cassette is used up, the photosensitive material extending from the buffer box drive rollers to the cutting station in the camera processor is driven back into the bite of the roller pair so that the leader is not exposed to light entering the buffer box through the buffer box exit orifice when the two-part unit is thereafter removed and replaced with a similar two-part unit bearing a different type of material. When the photosensitive material in any two-part unit becomes exhausted, the reusable buffer box is unfastened from the disposable cassette, and the disposable cassette is thereafter thrown away and the buffer box is reused with a fresh cassette.

It is desirable for the lead edge of the roll of material to maintain a constant location with respect to the cutting knife within the camera so that the first sheet cut has a constant length rather than having a variable length where the first sheet leading edge is long or short of the referencing knife position. In other words, it is desirable to automatically cause the leading edge of the sheet to be positioned at the referencing knife position after insertion of the two-part cassette device into the camera so that a fixed amount of roller rotation of the drive means causes the sheet of the first frame to have a predetermined length. It is also desirable to automatically cause the leader extending from the two-part cassette to be withdrawn a predetermined amount almost into the bite of the buffer box roller pair upon withdrawal of the two-part cassette from the camera.

SUMMARY OF THE INVENTION

In accordance with a preferred embodiment of the present invention, elongated projection members, positioned at opposite ends of one of the buffer box rollers, are manually inserted into a pair of referencing guide slots in the camera frame during the step of seating the two-part cassette device into the camera. A first gear member is concentrically positioned between one elongated projection member and the roller. A second buffer box roller gear member is positioned adjacent the referencing guide slot so that upon seating of the buffer box of the two-part cassette device, the first gear meshes with the second gear and is turned a predetermined amount during passage of the projection member through the slot until the buffer box is seated therein, thereby to cause the above-mentioned automatic predetermined advancement of the film. Upon withdrawal, the first drive gear is rotated in the opposite direction in like manner to cause the predetermined automatic withdrawal of the film back into the buffer box.

Other objects, features, and advantages of the present invention will become apparent upon the perusal of the following detailed description taken in conjunction with the figures in which:

FIG. 1 discloses a prior art buffer box and disposable cassette;

FIG. 2 illustrates a first view of a preferred embodiment;

FIG. 3 discloses a second view of a preferred embodiment;

FIG. 4 discloses a third view of a preferred embodiment;

FIG. 5 schematically illustrates the interaction of various elements of the preferred embodiment to more clearly explain the invention;

FIG. 6 discloses an additional view of the detachable fastener in the open position; and FIG. 7 discloses the detachable fastener in the closed position.

DETAILED DESCRIPTION

Figure 3:
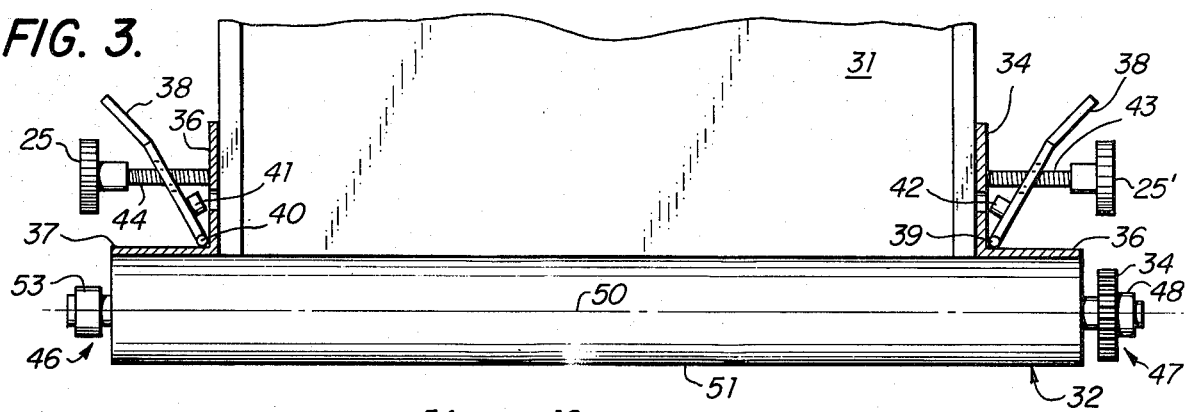

The two-part replaceable supply device of the above-mentioned co-pending patent application includes disposable cassette 1, shown in FIG. 1, containing a roll of photosensitive material 2 having a leader portion 3 which extends through light seal 4 positioned within exit orifice 6. Light tight buffer box 7 is detachably fastened to disposable cassette 1 by, for example, screws 8 and 9. Pins seated in holes, or other fasteners may obviously be utilized for this purpose. Rollers 11 and 12 are capable of driving the leader 3 through buffer box exit orifice 13 to cutting station 15 positioned within the camera processor. Locating pins 17 and 19 extending from the buffer box may be provided for positively locating exit orifice 13 with respect to cutting station 15.

After a number of exposures are made within the camera processor, it is often desirable to substitute a second type of photosensitive material in place of material 2 in the above-mentioned disposable cassette, even though the supply within cassette 1 is not exhausted. Rollers 11 and 12 are rotated to drive the material extending into the camera processor to cutting station 15 back to the bite of rollers 11 and 12 so that the leading edge is positioned at the bite but is not driven beyond the bite or all of the way through light seal 4. The two-part unit is thereafter removed from the camera processor, and a similar two-part unit containing a different type of photosensitive material is inserted into the camera processor, and a similar procedure is carried out as set forth hereinabove.

Since the leading edge of photosensitive material 3 is preferably driven fairly close to the bite of rollers 11 and 12, light entering orifice 13 does not fog substantial portions thereof. The leader portion between the bite of rollers 11 and 12 and light seal 4 is not fogged since light entering orifice 13 is blocked by tapered portions 10 and rollers 11 and 12. The inside walls of the buffer box preferably bear a light absorbing coating to further prevent fogging. Thus, upon the removal of any particular two-part unit, no fogging occurs. Foam members 25 and 25' positioned between box 7 and cassette 1 as shown further prevent fogging.

When the material is exhausted in the disposable cassette of any two-part unit, detachable fasteners, e.g., screws 8 and 9, are actuated to detach buffer box 7 from disposable cassette 1 so that the dispoable cassette may be thrown away, and the buffer box containing the roller pair may be reused with a fresh cassette, thereby to result in cost savings, in contrast with cassettes having rollers built therein. Furthermore, since rollers 11 and 12 are positioned within the buffer box, it is impossible to inadvertently drive leader 3 all of the way into cassette light seal 4, thereby to prevent the waste of a cassette containing a remaining amount of photosensitive media.

An important subsidiary aspect of the device of FIG. 1 is the positioning of light seal means such as seals 21 and 23 away from buffer box orifice 13. This arrangement enables the use of a buffer box exit orifice which does not require light seals therein, similar to cassette light seal 4. This is important since the leader must be driven back and forth through orifice 13 during the insertion and replacement cycles of any particular two-part supply device.

Referring now to FIG. 2, disposable cassette 31 is illustrated having buffer box 32 attached thereto by detachable fastener means 33 to be described hereinafter. The above-mentioned first gear means coupled to the lower buffer box roller is partially illustrated at 34 which gear is rotated by virtue of contacting the second gear in the camera mentioned hereinabove.

FIG. 3 illustrates flange members 34 and 36 affixed to buffer box 32 at 36 and 37. A portion of the cassette 31 is illustrated fitted in position between the buffer box flange members 34 and 36. The preferred fasteners comprise hinge members 38 pivoted at 39 and 40, the hinge members having studs 41 and 42 affixed thereto. After cassette 31 is positioned between flange members 34 and 36, so that the cassette exit orifice is aligned with the inlet orifice of the buffer box as shown in FIG. 1, threaded knobs 25 and 25' are turned by the operator about threaded bolts 43 and 44 respectively, to cause studs 41 and 42 to be positioned within receptor cavities 44 and 46 illustrated in FIG. 2 by virtue of rotating the hinge members 35 and 37, and detachably affix buffer box 32 to disposable cassette 31. When the film supply in the disposable cassette is exhausted, the operator turns the threaded bolts to cause the hinge members to rotate about pivots 39 and 40 to withdraw studs 41 and 42 from receptor cavities 44 and 46, thereby to permit rapid removal of the throw away cassette from the reusable buffer box.

Figure 4:
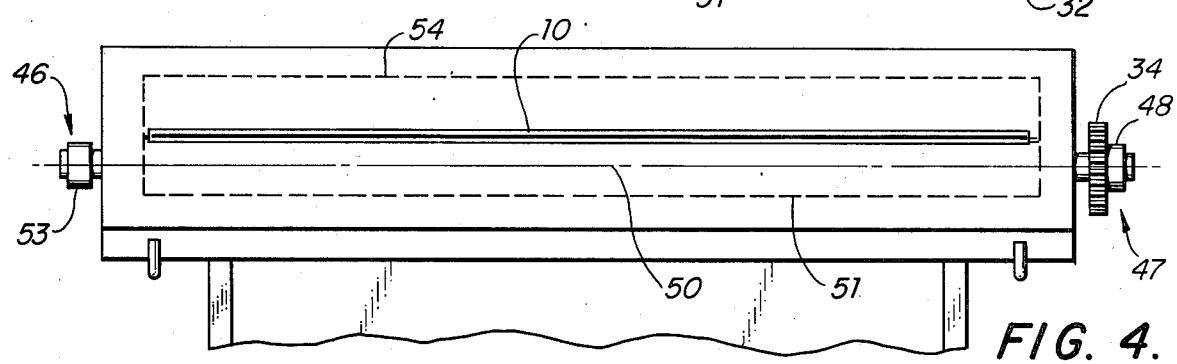

In order to provide for the above-mentioned predetermined advancing and withdrawing of the film during insertion and removal of the two-part cassette-like device to and from the camera, elongated positioning members 46 and 47 are provided as illustrated in FIGS. 3 and 4. Elongated positioning member 47 consists of a cylindrical projection member portion 48 and a first roller drive gear 34, concentrically mounted with respect to the axis of rotation 50 of lower roller 51 illustrated in FIGS. 2 and 3. Positioning member 46 coupled to the other end of lower roller 51 consists of a projection member 53, which is preferably a roller as is 48, which is rotatable with respect to axis 50. Roller 48 is also schematically illustrated in FIG. 5 along with the first gear means 34 which drives the lower buffer box roller. The upper buffer box roller 54 illustrated in FIG. 4 is freely rotatable and contacts lower roller 51 and is driven thereby. The bite between rollers 51 and 54 is positioned adjacent the buffer box exit orifice 10 in order to enable the film to be driven from the buffer box into the cutting station 15 of the camera processor illustrated in FIG. 1.

Figure 5:
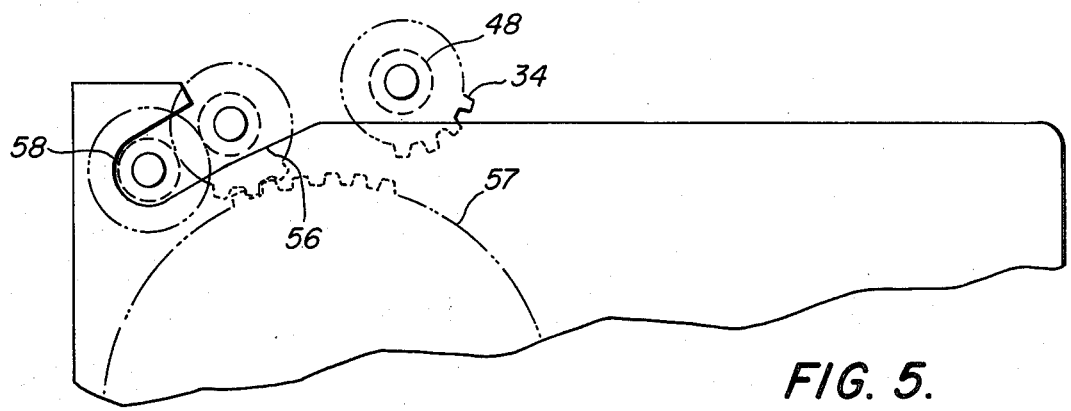

In FIG. 5, the referencing guide means is illustrated as guide slot 56 as illustrated. It is important to note that in the preferred embodiment, the second drive gear means 57, which is rotatably mounted in the camera processor, is positioned adjacent referencing guide slot 56. The operator merely causes roller 48 to contact slot 56 while pushing roller 48 into the slot until it is seated at the extreme portion 58. This action causes the teeth of gear 34 to contact the teeth of gear 57 during insertion and causes a predetermined counter-clockwise rotation of gear 34 (due to reaction forces) against gear 57 during the seating process, thereby to feed a predetermined length of film from the buffer box to the cutting station 15. Slot 56' is formed in an opposite portion of the frame of the camera processor, not shown, which slot guides and receives rotatable positioning member 53, shown in FIGS. 3 and 4, coupled to the opposite end of roller 51. Stationary gear means 57 is not rotated during the insertion process because it is coupled to drive means, not shown. After the insertion step is completed, the film is driven from the disposable cassette 31 through the buffer box by the rotation of the second gear 57 actuated by the drive means. When it is desired to remove the two-part cassette device from the camera processor, the operator pulls on the buffer box to unseat it and to cause gear 34 to be rotated in a clockwise direction thereby to feed the leading edge of the film from the cutting station back to a position directly adjacent the bite of the buffer box drive rollers illustrated in FIG. 1. This controlled predetermined feed-in prevents the lead edge from being fogged and yet does not drive the film too far to the right of the bite of rollers 41 and 42 illustrated in FIG. 1 so that the leader may again be driven out of the buffer box subsequently by the actuation of the lower drive roller 12.

When a fresh cassette is fastened to the buffer box, the buffer box rollers are separated by a conventional cam-lever mechanism, not shown, which permits the leading edge of the film to be grasped within the bite of the buffer box rollers. The cam-lever mechanism thereafter is again actuated to cause the roller to come together to engage the leader.

Figure 7:
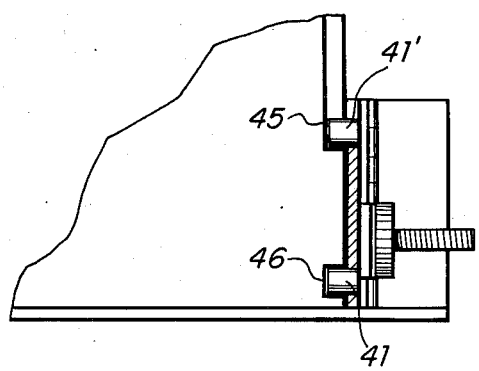
Figure 6:
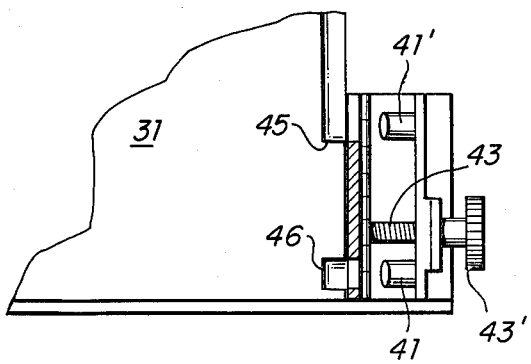

In FIG. 6, stud 41 is illustrated aligned with the cylindrical cassette receptor cavity 46 while stud 41' is shown aligned with a shoulder portion 45 of the disposable cassette 31. As mentioned above, threaded knob 43 is rotated to cause stud 41 to be inserted within receptor cavity 46 as illustrated in FIG. 7 while stud 41' contacts shoulder 45.

In summary, a preferred arrangement is disclosed to provide for a reusable buffer box co-acting with a cheap disposable cassette which contains a minimum of moving parts. The arrangement provides of controlled predetermined advancement and withdrawal of film in a manner set forth above for the purposes previously described. It is also contemplated that the above-described arrangement may be employed in a non-disposable cassette means wherein fresh film replaces depleted film where access to the interior of the film cartridge is obtainable.

Obviously, numerous variations in the preferred components may be employed, if desirable. For example, it may be feasible with respect to an inexpensive machine to substitute rubber rollers for the gears 34 and 57. Other guide means may be employed such as optical fiducials rather than positive acting slots. Obviously, other detachable fastening devices may be employed in place of those described although the preferred detachable fasteners provide for quick and positive referencing of the buffer box with respect to the disposable cassette.

While preferred embodiments of the invention have been described, the teachings of the invention will readily suggest many other embodiments to those skilled in the art.

What is claimed is:

1. In a system for supplying and transporting photosensitive media across the exposure station of a camera, which system includes:
   a. a disposable cassette for containing said photosensitive media;
   b. a buffer box;
   c. means for detachably fastening said buffer box to said cassette at a position thereon so that said media may be driven through said buffer box into the exposure station of said camera;
   d. first drive means coupled to said buffer box for driving said photosensitive material emanating from said disposable cassette through said buffer box and into said camera;
   e. second drive means coupled to said camera at a position thereon for actuating said first drive means for transporting said photosensitive media with respect to said buffer box when said buffer box is properly seated with respect to said camera, the improvement comprising;
   f. seating means for properly seating said buffer box with respect to said camera and for causing said first drive means to be positioned with respect to said second drive means for enabling actuation of said first drive means by said second drive means and for producing limited controlled actuation of said first drive means in a first media feed out direction during the process of seating of said buffer box with respect to said camera and limited controlled actuation of said first drive means in a second media feed in direction during the process of unseating said buffer box.

2. The system set forth in claim 1 wherein said seating means includes a referencing guide means and said first drive means has a positioning means coupled thereto which contacts said referencing guide means to enable the production of reaction forces upon said first drive means by said second drive means.

3. The system of claim 2 wherein said first drive means includes a first gear means coupled to said positioning means and said second drive means includes a second gear means for driving said first gear means.

4. The system of claim 4 wherein said first gear means is concentric with said positioning means which further comprises an elongated projection member.

5. The system of claim 2 wherein said referencing guide means includes slot means formed in said camera for properly positioning said positioning means and hence said first drive means with respect to said second drive means during seating and unseating of said buffer box to produce said limited controlled actuation.

6. The system of claim 1 wherein said first drive means includes a first gear means and said second drive means includes a second gear means for driving said first gear means.

7. In a system for supplying and transporting photosensitive media across the exposure station of a camera, which system includes:
   a. a disposable cassette for containing said photosensitive media;
   b. a cassette exit orifice for permitting said photosensitive material to be transported out of said disposable cassette;
   c. a buffer box;
   d. means for detachably fastening said buffer box to said disposable cassette at a position thereon so that said media may be driven through said buffer box into the exposure station of said camera;
   e. first drive means coupled to said buffer box for driving said photosensitive material emanating from said disposable cassette through said buffer box and into said camera;
   f. second drive means coupled to said camera at a position thereon for actuating said first drive means for transporting said photosensitive media with respect to said buffer box when said buffer box is properly seated with respect to said camera, the improvement comprising:
   g. seating means for properly seating said buffer box with respect to said camera and for causing said first drive means to be positioned with respect to said second drive means for enabling actuation of said first drive means by said second drive means, said seating means;
      i. being configured to produce limited controlled actuation of said first drive means in a first media feed out direction during the process of seating of said buffer box by the reaction forces produced by said second drive means against said first drive means and
      ii. being configured to produce limited controlled actuation of said first drive means in a second media feed in direction during the process of unseating said buffer box by the reaction forces produced by said second drive means against said first drive means.

8. The system set forth in claim 7 wherein said seating means includes a referencing guide means and said first drive means has a positioning means coupled thereto which contacts said referencing guide means to enable the production of said reaction forces upon said first drive means.

9. The system of claim 8 wherein said first drive means includes a first gear means coupled to said positioning means and said second drive means includes a second gear means for driving said first gear means.

10. the system of claim 10 wherein said referencing guide means includes slot means formed in said camera for properly positioning said positioning means and hence said first drive means with respect to said second drive means during seating and unseating of said buffer box to produce said limited controlled actuation.

11. The system of claim 7 wherein said first drive means includes a first gear means and said second drive means includes a second gear means for driving said first gear means.

12. The system of claim 9 wherein said first gear means is concentric with said positioning means which further comprises an elongated projection member.

13. A system for supplying and transporting photosensitive media across the exposure station of the camera comprising:
 a. a cassette for containing said photosensitive media, said cassette having a cassette exit orifice for permitting said photosensitive material to be transported therefrom;
 b. a buffer box having an input orifice and an output orifice and including a pair of drive rollers therein for transporting said photosensitive media through said input and output orifice, one of said rollers having a first gear means and first projection member at one extremity thereof and a second projection member at an opposite extremity thereof;
 c. means for detachably attaching said buffer box to said cassette to align the input orifice of said buffer box with the exit orifice of said cassette;
 d. a second gear means mounted in said camera; and
 e. a pair of elongated guide means formed in said camera for receiving said first and second projection members, said guide means being separated by a distance approximately equal to the distance between said first and second projection members for supporting said buffer box at extremities thereof, said guide means further being positioned and configured with respect to said second gear means so that said first gear means is rotated by a limited controlled amount by said second gear means as said projection members travel through said guide means during the seating and unseating of said buffer box with respect to said camera.

14. The system of claim 13 wherein said guide means comprise a pair of slots formed in said camera.

15. The system of claim 14 wherein at least one of said projection members includes a roller concentric with said first gear means for rolling within said slots for ease of insertion and removal of said buffer box with respect to said camera.

16. The system of claim 13 wherein at least one of said projection members includes a roller concentric with said first gear means for rolling within said guide means for ease of insertion and removal of said buffer box with respect to said camera.

17. In a system for supplying and transporting photosensitive media across the exposure station of a camera, which system includes:
 a. cassette means for containing said photosensitive media;
 b. first drive means associated with said cassette means for driving said photosensitive material out of said cassette means and into said camera;
 c. second drive means associated with said camera external of said cassette at a position thereon for actuating said first drive means for transporting said photosensitive media out of said cassette means when said cassette means is properly seated with respect to said camera, the improvement comprising
 d. seating means for properly seating said cassette means with respect to said camera and for causing said first drive means to be positioned with respect to said second drive means for enabling actuation of said first drive means by said second drive means and for producing limited controlled actuation of said first drive means in a first media feed out direction during the process of seating of said cassette means with respect to said camera and limited controlled actuation of said first drive means in a second media feed in direction during the process of unseating said cassette means.

18. The system set forth in claim 17 wherein said seating means includes a referencing guide means and said first drive means has a positioning means coupled thereto which contacts said referencing guide means to enable the production of reaction forces upon said first drive means by said second drive means.

19. The system of claim 18 wherein said first drive means includes a first gear means coupled to said positioning means and said second drive means includes a second gear means for driving said first gear means.

20. The system of claim 20 wherein said first gear means is concentric with said positioning means which further comprises an elongated projection member.

21. The system of claim 18 wherein said referencing guide means includes slot means formed in said camera for properly positioning said positioning means and hence said first drive means with respect to said second drive means during seating and unseating of said cassette means to produce said limited controlled actuation.

22. The system of claim 17 wherein said first drive means includes a first gear means and said second drive means includes a second gear means for driving said first gear means.

* * * * *